US007329355B1

(12) United States Patent
Burns et al.

(10) Patent No.: US 7,329,355 B1
(45) Date of Patent: Feb. 12, 2008

(54) METHOD FOR ABSORPTION OF HYDROCARBONS AND LOW-POLARITY CHEMICALS

(75) Inventors: Lyle D. Burns, Bartlesville, OK (US); Geoffrey O. Mitchell, Bartlesville, OK (US)

(73) Assignee: RTA Systems, Inc., Bartlesville, OK (US)

( * ) Notice: Subject to any disclaimer, the term of this patent is extended or adjusted under 35 U.S.C. 154(b) by 0 days.

(21) Appl. No.: 11/506,454

(22) Filed: Aug. 18, 2006

(51) Int. Cl.
*C02F 3/00* (2006.01)
*C02F 1/42* (2006.01)

(52) U.S. Cl. .................. 210/680; 210/693; 210/922; 210/925

(58) Field of Classification Search ............. 210/680, 210/693, 922, 925
See application file for complete search history.

(56) References Cited

U.S. PATENT DOCUMENTS

| | | | |
|---|---|---|---|
| 3,518,183 A | 6/1970 | Evans et al. | |
| 4,709,982 A | 12/1987 | Corne et al. | |
| 4,716,183 A | 12/1987 | Gamarra et al. | |
| 4,941,978 A | 7/1990 | Gabrick | |
| 5,104,548 A | 4/1992 | Gabrick | |
| 5,302,210 A | 4/1994 | Whyte | |
| 5,374,600 A | 12/1994 | Hozumi et al. | |
| 5,633,286 A | 5/1997 | Chen | |
| 5,994,450 A | 11/1999 | Pearce | |
| 6,056,805 A | 5/2000 | Litwin et al. | |
| 6,187,837 B1 | 2/2001 | Pearce | |
| 6,344,519 B1 | 2/2002 | Rink et al. | |
| 6,433,068 B1 | 8/2002 | Morrison et al. | |
| 6,712,976 B2* | 3/2004 | Manzone | 210/668 |
| 6,824,734 B2* | 11/2004 | Boggs et al. | 264/567 |
| 2003/0092836 A1 | 5/2003 | Eichenauer et al. | |
| 2004/0220323 A1 | 11/2004 | Gu | |
| 2004/0266948 A1 | 12/2004 | Jacob et al. | |
| 2005/0014891 A1 | 1/2005 | Quinn | |
| 2005/0082230 A1 | 4/2005 | Gonzales et al. | |
| 2005/0184619 A1 | 8/2005 | Chen | |

OTHER PUBLICATIONS

Ogando, Innovative Elastomer Products, Design News, Jul. 8, 2002, Published in: US.

* cited by examiner

*Primary Examiner*—Chester T. Barry
(74) *Attorney, Agent, or Firm*—Fellers, Snider, Blankenship, Bailey & Tippens, P.C.; Scott R. Zingerman

(57) ABSTRACT

The present invention relates to methods of recovering hydrocarbons or low polarity organic chemicals from hard surfaces, water and water surfaces, in their vapor state and from porous substrates. The hydrocarbons or low-polarity organic chemicals may be included in a spill. More particularly, the invention relates to the absorption of certain hydrocarbons and low-polarity organic chemicals by applying thermoplastic elastomers of a triblock copolymer of the general configuration A-B-A. The preferred A-B-A copolymer of the invention is a low to medium molecular weight hydrogenated polystyrene-poly(isoprene+butadiene)-polystyrene or polystyrene-b-ethylene/ethylene-propylene-b-styrene block copolymer. When the elastomeric block copolymer is applied to the hydrocarbon or low-polarity organic chemical, the elastomeric block copolymer absorbs the hydrocarbons or low-polarity organic chemicals to form a mat.

19 Claims, No Drawings

METHOD FOR ABSORPTION OF HYDROCARBONS AND LOW-POLARITY CHEMICALS

BACKGROUND OF THE INVENTION

1. Field of Invention

This invention relates to a method for controlling and recovering hydrocarbon or certain low-polarity organic chemicals.

2. Brief Statement of the Prior Art

Hydrocarbon fuel, oil, and chemical spills occur frequently on a multitude of surfaces. On land, clay sorbents, cellulose or sphagnum products, surfactants, or other bioremedial methods to name a few are used in these situations with the intent of cleaning up the spill in a quick fashion or bioremediating a contaminated soil surface over time. On the water, spills tend to present unique problems and requires the responders to assess each spill quickly and choose among a variety of spill response products such as absorbents, adsorbents, gelling agents, sinking agents, surface washing agents, dispersants, biodegradation agents, biodegradation enhancers, de-mulsifiers, herding agents and approaches such as in situ burning. Factors such as cold water or broken ice conditions can change the physical state of crude oils making broad application of chemical dispersants more difficult and ineffective.

Various techniques and materials have been used as absorbents in helping to minimize contamination resulting from hydrocarbon fuel, oil, and chemical spills. Absorbents generally function by attracting materials to their pore spaces. Adsorbents such as polypropylene fibers function by hydrophobic nature in water and oleophilic attraction of the oil to wick into the surface area of the fiber.

Furthermore, various elastomeric materials of the prior art are disclosed regarding A-B-A triblock elastomers for hydrocarbon absorption during environmental cleanup on water. The A-B-A elastomers currently utilized include Styrene-Butadiene-Styrene, SBS or Styrene-Isoprene-Styrene, SIS (U.S. Pat. No. 3,518,183), Styrene-Butadiene-Styrene/Ethylene-Propylene Diene Monomer, SBS/EPDM (U.S. Pat. No. 6,344,519), Styrene-Ethylene-Butylene-Styrene, SEBS (U.S. Pat. No. 4,941,978 and U.S. Pat. No. 5,104,548), or Styrene-Ethylene-Propylene-Styrene, SEPS (U.S. Pat. No. 6,056,805).

Many of the prior art copolymers used in spill cleanup, due to their absorbent properties, are of the SEBS type copolymer. A SEBS type copolymer is a polystyrene-poly(ethylene/butylene)-polystyrene copolymer. Examples are KRATON G-1650 or KRATON G-1651 or KRATON G-1652 made by Shell Chemical Company. The KRATON G series, produced by anionic polymerization, are block polymers in which the elastomeric portion of the molecule is a saturated olefin polymer of the type ethylene/butylenes.

However, while the current triblock elastomers have been useful in containing spills, there remains a need for absorbents that have improved elasticity and tensile strength over the prior art with comparable softness. Moreover, there is a need for materials that reduce or eliminate oil bleed during spill absorption. Finally, there is a need for materials that can accomplish the aforementioned goals while remaining cost effective.

OBJECTS OF THE INVENTION

It is an object of this invention to addresses the foregoing needs for hydrocarbon and low-polarity organic chemical recovery from hard surfaces, soil, and the aqueous surfaces of ponds, lakes, streams or at sea and especially in the icy waters of the artic regions.

It is a particular object of this invention to provide advantageous characteristics with the preferred elastomeric triblock copolymer, such as improved elongation and tensile strength over the prior art with comparable softness and a reduced oil/hydrocarbon bleed or no bleed due to its superior chemistry and physical properties compared to others used in the prior art.

It is also an object of this invention to make use of a material that incorporates the advantageous characteristics described above while remaining cost effective and easy to manufacture.

SUMMARY OF THE INVENTION

The present invention relates to methods of recovering spills of hydrocarbons and low polarity organic chemicals from hard surfaces, water and water surfaces, in their vapor state and from porous substrates. Such recovery may be necessitated by spills or other undesirable deposits of may be the result of manufacturing or production processes, such as, for example, oil drilling and/or production, all referred to herein, generally, as a spill or "spills." More particularly, the invention relates to the absorption of certain hydrocarbons and low-polarity organic chemicals by applying thermoplastic elastomers of a triblock copolymer of the general configuration A-B-A. The preferred A-B-A copolymer of the invention is a low to medium molecular weight hydrogenated polystyrene-poly(isoprene+butadiene)-polystyrene or polystyrene-b-ethylene/ethylene-propylene-b-styrene block copolymer often referred to as SEEPS. This preferred elastomeric block copolymer has improved elasticity and tensile strength over the prior art with comparable softness and reduces or eliminates oil bleed while and remaining cost effective and easy to manufacture. In one embodiment, when the elastomeric block copolymer is applied to hydrocarbons or low-polarity organic chemicals, the elastomeric block copolymer absorbs the hydrocarbons or low-polarity organic chemicals to form a mat.

In accordance with another embodiment, the material of the invention can be used as a filter medium to separate liquid or gaseous non-polar hydrocarbons and chemicals from highly polar compounds.

In accordance with a further embodiment, the material can be placed into a disposable sock, boom, or pad covering. The sock, boom, or pad allows the hydrocarbon or low-polarity chemical to pass through the covering, but does not allow the inventive material to pass out of the covering before or during use. The hydrocarbon or low-polarity chemical mixes with the inventive material and neither the spill nor the mixture returns to the environment.

In accordance with a further embodiment, the elastomeric block copolymer can be mixed with metal stearate or with a styrene-ethylene/butylenes diblock or triblock copolymer. These mixtures allow for better absorption characteristics of the inventive material with respect to certain types of spills.

In accordance with another embodiment, the elastomeric block copolymer can be mixed with drilling mud and drill cuttings. The resulting mixture creates a material that functions well as a fuel source capable of giving off 19,000 British Thermal Units (BTU's) of energy.

In accordance with another embodiment, the elastomeric block copolymer, in particulate form, is vacuum sealed in a container and heated for a period of time to create a molded absorbent material.

These and various other features and advantages which characterize the claimed invention will be apparent from reading the following detailed description.

DESCRIPTION OF THE PREFERRED EMBODIMENTS

Before explaining the present invention in detail, it is important to understand that the invention is not limited in its application to the details of the construction illustrated, or by the steps of construction inherently present by way of illustration. The invention is capable of other embodiments and of being practiced or carried out in a variety of ways. It is to be understood that the phraseology and terminology employed herein is for the purpose of description and does not impose limitation on the present invention.

In a preferred embodiment, for the material used to absorb hydrocarbons and low-polarity organic chemicals is a thermoplastic elastomer of a triblock copolymer of the general configuration A-B-A. Preferably, the chemical structure is polystyrene-poly(ethylene/ethylene/propylene)-polystyrene known more commonly as SEEPS. The ethylene segment in the SEEPS is derived from the polymerization of 1,3-butadiene to a poly2-butene segment, which after catalytic hydrogenation becomes a saturated hydrocarbon and named as an ethylene segment. The ethylene/propylene monomer in SEEPS is derived from the molecule isoprene.

One widely available SEEPS type which is suitable for the present invention is SEPTON 4033, SEPTON 4045, SEPTON 4055, and SEPTON 4077, manufactured by Septon Company of America in Pasadena, Tex., a part of Japan's Kuraray, Co. Ltd. of Tokyo, Japan. The only difference between the SEPTON triblock copolymers is molecular weight, however SEPTON 4033 is the most preferred version. However, it should be apparent to one of ordinary skill in the art that other triblock copolymeric materials made by others with similar chemical and physical characteristics can be used as a triblock copolymer of the invention as well.

The SEPTON 4000 (SEEPS) series block copolymers are made from hydrogenated styrene isoprene/butadiene styrene blocks or more specifically, the soft block is made from hydrogenated 2-methyl-1,3-butadiene (isoprene) and 1,3-butadiene. In controlled polymerization, if the ethylene portion of the mid block (EB/EP) is substantially greater than the butylene, then the copolymer should exhibit ethylene crystallinity in the mid block.

The styrene portions of the SEPTON 4033 constitute 30% of its weight. SEPTON 4033 has a mid block which is prepared from a combination of 1,3-butadiene and 2-methyl-1,3 butadiene (isoprene) monomers. The mid block produced by polymerization of those monomers has a carbon backbone, which includes, on average, one double bond every four carbons. After polymerization, over 90 percent of the double bonds of the SEPTON 4033 mid block backbone are removed by hydrogenation. The mid block also has only methyl side chains. The methyl side chains of the SEPTON 4033 mid block are a result of the use of isoprene monomers in polymerization.

In the preferred embodiment of the invention, the thermoplastic elastomer triblock copolymer is applied to hydrocarbons or low-polarity organic chemicals. In one embodiment, the hydrocarbons or low-polarity organic chemicals occur in the form of a spill on a surface, such as a body of water. When the triblock copolymer mixes with the hydrocarbons or low-polarity organic chemicals, the triblock copolymer absorbs the hydrocarbons or low-polarity organic chemicals to form a mat. This mat can then easily be recovered. For the purpose of exemplification, and without limitation, the hydrocarbon or low-polarity organic chemical may be any of at least one of: oils, waxes, hydrocarbons, fuels, crude oils, bitumen, edible oils, edible waxes, saturated aliphatic, unsaturated aliphatic, napthenic, aromatic substituted oxygen derivatives of alcohols, phenols, ethers, ether alcohols, epoxides, esters, ester derivatives, aldehydes, acetals, ketones, ketals, nitrogen containing derivatives of amines, nitrites, sulfur containing derivatives of mercaptans, disulfides, heterocyclic derivatives of disulfides, halocarbons, organosilanes, halosilanes, silicones, agricultural chemicals, industrial chemicals, chemical warfare agents, or chemicals derived from petroleum.

Ideally, the triblock elastomer should recover 100% of the oil or hydrocarbon from a surface or leave only very low ppm of substance on the surface to be cleaned. The elastomer should retain the hydrocarbon or low-polarity organic chemical without bleeding. The elastomer/(hydrocarbon or low-polarity organic chemical) ratio by weight of the present invention ranges from as 1/1 to about 1/15 depending on the specific hydrocarbon or low-polarity organic chemical. In applications where oil bleed is acceptable, or the amount of residual bleed is tolerable economically, the ratio may as high as about 1/25 or more. Preferably, the elastomer/hydrocarbon low-polarity organic chemical ratio is in the range of about 1/1 to about 1/10. More preferred are elastomer/oil or hydrocarbon or low-polar organic chemical ratios in the range of about 1/2 to about 1/4.

A preferred ratio, such as 1/4, generally provides the desired amounts of rigidity, elasticity and strength with low bleed for many typical spill applications. Another preferred elastomer to hydrocarbon or low-polarity organic chemical ratio of the preferred materials of the present invention is 1/3, which possesses an unexpectedly high amount of strength and elongation.

When the triblock copolymer of the invention is contacted with the hydrocarbon or non-polar organic chemical contaminant, the absorption that occurs that may take from minutes to up to one hour or longer, depending on conditions, nature of the contaminant, temperature, humidity, etc. As the mat continues to form over time, the mat will strengthen as the level of absorption continues to grow. Loading capacity for the triblock copolymer of the invention is at least 2:1 (200 percent) by weight of contaminant to polymer to 10:1 (1000 percent) as shown by the examples below of the invention with liquid contaminants where efficiency is 100 percent.

In one embodiment, mixtures of elastomers are suitable as the elastomer component for some of the formulations of the present invention. In elastomer mixtures, each elastomer contributes different properties to the material. For example, high strength elastomers are desired to improve the tensile strength and durability of a material. Likewise, addition of A-B diblock copolymers to an A-B-A triblock copolymers reduced oil bleed and tackiness.

In another embodiment, the elastomeric material of the present invention may also include a de-tackifier. Soaps, detergents and other surfactants often have detackifying abilities and are suitable for use in the present invention. "Surfactants," as defined herein, refers to soluble surface active agents which contain groups that have opposite polarity and solubilizing tendencies, as well as detergency, foaming, wetting, emulsifying and dispersing properties. For example, but not by way of limitation, coco diethanolamide, a common ingredient in shampoos, may be suitable in the present invention as a de-tackifying agent. Other preferred de-tackifiers include glycerin, epoxidized soybean oil, dimethicone, tributyl phosphate, block copolymer polyethers, diethylene glycol mono oleate, and silicone.

In a further embodiment, the elastomeric material of the present invention may also be made non-adhering, non-sticking, and non-tacky by incorporating an advantageous advantage amount of a metal stearate such as sodium, calcium, magnesium or zinc stearate. Sodium stearate is particularly suitable to improve strength and reduce tack in the material of the invention.

A preferred triblock copolymer of the present invention may contain other additives such as primary antioxidant stabilizers to protect against free radical thermo-oxidative degradation. A common primary antioxidant such as IRGANOX 1010, from Ciba-Geigy Corporation of Tarrytown, N.Y., may be used in conjunction with a secondary antioxidant. IRGANOX 1010 is commonly known as Tetrakis [methylene(3,5-di-t-butyl-4-hydroxyhydrocinnimate)]methane. Secondary antioxidants may also be used. Secondary antioxidants are hydroperoxide decomposers and constitute chemicals such as phosphites, phosphonites and thioesters. For example, and not by limitation, chemicals such as distearyl pentaerythritol diphosphite, sold under the trade name of Weston 618 from GE Specialty Chemicals, Morgantown, W. Va., and dilauryl thiodipropionate available from Chemtura USA Corporation, Middlebury, Conn., are suitable secondary antioxidants.

In a further embodiment, other additives might be incorporated into specific applications of the present invention to act as flame retardants. Examples of these additives include, but are not limited to, diatomaceous earth, colorants and pigments, bleed modifiers such as diblock copolymers, and tensile strength modifiers such as other hydrocarbon resins that might associate with the mid block "B" copolymer.

The types of oils, hydrocarbons and low-polarity organic chemicals that may be recovered by the present invention are diverse. The types of oils and hydrocarbons include mixtures of oils, hydrocarbons and low-polarity organic chemicals as well as pure substances. The hydrocarbon oils include any and all crude oils of various API gravity, sulfur content and other physical properties; hydrocarbon oils of a paraffinic, isoparaffinic, naphthenic, or aromatic nature as well as polybutenes and other synthetic oligomers and polymers.

Examples of the types of refinery cuts and fuels that may be recovered by the invention include white gas, fully blended gasolines and gasoline blending streams, kerosene, jet fuels, mineral spirits and similar solvents, diesel fuels, home heating oil and other hydrocarbon refinery streams that encompass practically any refinery cut even down to the heavy oil cuts boiling into the 900-1300° F. range and even certain products from the 1300° F.+ bottoms. Other oils, hydrocarbons and bitumen suitable for absorption recovery with the invention may be derived from tar sands, shale oil, coal liquifaction products and the like. Additional edible oils suitable for absorption recovery are the waxes, and vegetable, animal, and fish oils, both saturated and unsaturated. It should be understood however, that the above examples do not include a finite list, but are merely examples. Other types of materials, oils, hydrocarbons, and low-polarity organic chemicals will be apparent to one skilled in the art.

Types of low-polarity organic chemicals that may be recovered by the invention are diverse and varied as well. Examples include certain saturated or unsaturated aliphatic, naphthenic, or aromatic substituted: oxygen derivatives of alcohols, phenols, ethers, ether alcohols, epoxides, esters and ester derivatives, aldehydes, acetals, ketones, ketals and nitrogen containing derivatives of amines, nitrites, and sulfur containing derivatives of mercaptans, disulfides, and heterocyclic derivatives thereof and halocarbons and organosilanes or halosilanes, silicones, and other low-polarity organometallic compounds and the like. The types of low-polarity organic chemicals mentioned are not intended to be all encompassing, but simply as functional group examples to demonstrate to one skilled in the art the breadth of utility of the present invention.

Since the preferred product of the invention is most widely available in a granular bulk form, it is often desirable to incorporate the product into a sheathing to create a disposable absorbent sock, boom, or pad containing the product. The objective is to allow the hydrocarbon or non-polar chemical to pass through the sheathing, but not allow the inventive product to pass out of the sheathing before or during use. As it is one objective that the preferred absorbent of the invention lock in the hydrocarbon or non-polar chemical into a stable polymer matrix and not return it to the environment, the sheathing should preferably have a pore size of approximately 200 microns. Such a size will prevent the product from escaping.

One embodiment of the invention utilizes a fabric or textile as the sheathing material. Polyester tricot knit fabrics can be used as suitable sheathing material. A second example of material is a polypropylene extruded net material with a small diamond shaped hole size of 0.015 inch and a thickness of 0.030 inches. Both of these materials exhibit negligible water absorption, thus allowing the sheathing after mixing with the spill to be burned efficiently as an energy source in, for example, a cement kiln. Thus, the resultant sheathing material is rendered into a usable, salable product.

In accordance with another embodiment, the elastomeric block copolymer can be mixed with drilling waste during the drilling process. When drilling for certain substances, such as oil, there is normally byproduct waste created. Some of the waste takes the form of drill cuttings. These drill cuttings are mixed with drilling mud, which is typically used to lubricate and cool the drill during use as well as to flush the cuttings out of the hole created. As drilling cuttings are flushed by the mud to the surface, there tends to be spillage of the mixture onto the surface. When this occurs, the elastomeric block polymer may be added to the spill. The elastomeric block polymer can also be added the waste mixture that did not spill onto the surface if a means is needed for easy removal of the waste mixture. When the elastomeric block polymer is added to this waste mixture, a mat is created. This mat can be used as a fuel source capable of giving off as much as 19,000 BTU's of energy. The fuel source can be utilized as a low ash and high-energy fuel in, for example, cement kilns.

In accordance with another embodiment, the elastomeric block copolymer can be molded into three-dimensional products. When in particulate form, the elastomeric block polymer may be in placed into, for example, a plastic bag. The bag containing the particles may then be vacuum sealed. The container is then heated at a sufficient temperature for a sufficient amount of time to form a molded absorbent article. A suitable temperature is 106° Fahrenheit for a suitable time of approximately 24 hours. The molded absorbent material still retains absorbent properties, however, through the simple process of heating, it can be molded into whatever shape the manufacturer desires. An example would be to mold the particulate product into an aesthetically pleasing floor mat that could be placed in a garage under a motor vehicle or in an industrial setting where machine fluids are known to leak. Examples of aesthetically pleasing designs could be a company or individual name or company logo.

SEPTON 4033 was determined to provide the best performance for elasticity and absorbance among the SEPTON 4000 and SEPTON 8000 series of products. When comparing the performance of triblock copolymers of the invention with triblock copolymers of the prior art, qualitative observations were made using elasticity and absorption characteristics as the criteria. Two rating scales, one for elasticity and one for the absorbency properties of the invention were created for the purpose of making observations in the examples that follow.

Elasticity Rating
10. Strong single dry mat, with excess polymer on the surface
9. Single mat, dry mod strength
8. No mat, but dry crumbs with excellent absorption
7. Single mat, slightly oil wet, small particle, contracted
6. Single mat, tacky, with some strength
5. Single mat, very tacky with low strength
4. Single weak mat, very tacky, breaks easy with light pressure
3. Single weak mat, very tacky, dissolved most of the elastomer
1. No mat, oily looking crumbs
1. No mat, oily looking, very tacky, polymer total dissolved in oil Absorbency Properties
10. Absolutely no oil sheen or film, mat dry and firm to touch with excess polymer on top
9. No oil sheen, mat looks dry, but not to touch with excess polymer on top
8. No obvious oil sheen ~0-15 ppm oil, polymer leaves residue on circumference of vessel
7. Very, Very slight oil sheen, ~15-30 ppm, polymer looks dry but will leave oil to touch
6. Slight oil sheen ~250-500 ppm, polymer looks somewhat dry on surface, but oily touch
5. Significant oil sheen, polymer looks oily 500-1,000 ppm
2. Lots of oil on water, 1-2% and looses oil to absorbent paper towel
3. Only moderate polymer absorbency, looses oil to absorbent paper towel
2. Low polymer absorbency, looses lots of oil to absorbent paper towel
1. No absorbency Initial percent oil bleed was quantitatively measured by weighing a section of absorbent tissue or paper towel and blotting the residual surface oil from the elastomer mat and container and re-weighing the absorbent material, the difference being related to the initial oil or hydrocarbon bleed. As the elastomer/hydrocarbon or low-polarity organic chemical mixture ages, additional bleed is often much lower. The absorbent tissue or paper towel has dimensions of about 10 cm×10 cm folded over 2-3 times to provide a thickness of about 2-3 mm. The bleed was determined by the weight differences.

A further measure of oil bleed was obtained from extracting the oil or hydrocarbon residual on the water's surface with methylene chloride, drying by filtering through anhydrous sodium sulfate, and performing a gas chromatography analysis for Total Petroleum Hydrocarbons (EPA method 8015m).

EXAMPLE 1

The results of these procedures are summarized in Table 1. Five grams of Bartlesville Sand crude oil (nominally 37-38 API gravity) was placed on the surface of 100 g of tap water in a beaker. With the beaker on the balance, 2.50 g of triblock copolymer was sprinkled evenly on the surface of the water. The beaker was set aside for 60 minutes before further experimentation. In a second series of experiments, 1.00 g of triblock copolymer was used according to the procedure.

As can be seen from the results in Table 1, the preferred object of the invention using SEPTON 4033 had better absorbency than the prior art at the higher concentrations, but extensively outperformed the prior art at the lower useful range of copolymer to crude oil concentrations. The KRATON G-1650 triblock copolymer was the closest of the prior art to SEPTON 4033, but at lower concentrations the KRATON G-1650 mat actually looked more like a "tar-like" substance that rolled up into a ball as a polypropylene fiber would when it absorbs oil. Again suggesting from its molecular structure, that the mid-block segment is more like an amorphous polyolefin with ethyl branching than the SEPTON mid blocks segments that have a very minor degree of unsaturation with only methyl branches and some level of crystallinity in the mid block. Polyolefins adsorb oil more than they absorb oil. KRATON G-1651 and KRATON G-1652 did not perform well at all at the lower concentrations of utility.

TABLE 1

Comparison of SEPTON 4033 with KRATON Elastomers For Absorbing 5 g Crude Oil[1] on Water[2].

| Entry No. | Elastomer | Elasticity Rating | Absorbency Rating | Oil Content on Paper Towel |
|---|---|---|---|---|
| 1 | 2.50 g SEPTON 4033 | 10 | 10 | None |
| 2 | 1.00 g SEPTON 4033 | 7 | 7 | 0.39 g (no polymer) |
| 3 | 2.50 g KRATON G-1650 | 10 | 9 | None |
| 4 | 1.00 g KRATON G-1650 | 2 | 7 | 0.81 g |
| 5 | 2.50 g KRATON G-1651 | 6 | 9 | Slight Show |
| 6 | 1.00 g KRATON G-1651 | 2 | 4 | 1.15 g |
| 7 | 2.50 g KRATON G-1652 | 10 | 8 | None |
| 8 | 1.00 g KRATON G1652 | 2 | 4 | 1.01 g |

[1] Bartlesville Sand Crude Oil
[2] 100 g of water

EXAMPLE 2

A sample such as Entry 2, Table 1, was prepared from the mixture of 5.00 g of crude oil and 1 g of SEPTON 4033 on 100 g of ice in a plastic cup. The ice was allowed to thaw over the period of 1 hour while the invention absorbed the crude oil and formed an elastic mat. After 1 hour, the sample was briefly contacted with a propane torch. The sample flash burned for a second and self extinguished indicating volatile light ends of the crude oil were combusted. The rubber mat was examined and judged to have superior elastic strength compared to a similar mat that had not been contacted with the flame.

EXAMPLE 3

5.00 g of Bartlesville Sand crude oil was added to a beaker followed by the careful addition of 2.50 g of SEPTON 4033. The elastomer immediately absorbed the oil in the beaker. With a small amount of stirring with a spatula, the oil film on the bottom of the beaker was absorbed to the point the beaker was clean and without an oily film. The SEPTON 4033, which was not oily in appearance, had matted together. A pre-weighed paper towel was used to blot any oil off the polymer and dry clean the beaker by wiping. The additional weight on the towel from this process was 0.0045 g or approximately 0.09% of the original crude oil weight.

5.00 g of Bartlesville Sand crude oil was added to a beaker, followed by 2.50 g of Oil Dri Premium Absorbent Fuller's Earth. At this point it became obvious the amount of Oil Dri was insufficient to absorb the crude oil. Therefore, additional Oil Dri was added in 2.50 g increments up to 15.00 g or six times as much as the SEPTON 4033 elastomer. At this point the crude oil was being absorbed, but the beaker still had an extensive oil film on the bottom surface no matter how much it was stirred. The absorbent also had an oily surface. A pre-weighed paper towel was used to blot any oil from the polymer and dry clean the beaker by wiping. The additional weight on the towel from this process was 0.1956 g or approximately 3.91% of the original crude oil weight at 6 times the weight of clay sorbent. The experiment was repeated with 5.00 g of crude oil and 20.00 g of Oil Dri. The Oil Dri was still oil wet and the amount of Oil Dri was increased to 25.00 g total (5 times the weight of oil and 10 times the weight of SEPTON 4033) at which time the Oil Dri did not have an oil wet surface that left any significant oil spotting on a paper towel. The beaker surface that was contacted by the oil was still not as clean as with the SEPTON 4033 product and it may never become that clean because of surface differences between the absorbents.

EXAMPLE 4

The following hydrocarbons and low-polarity organic chemicals were tested for elasticity and absorption with SEPTON 4033 using the ratings defined above. In cases where the low-polarity organic chemicals were slightly water soluble or denser than water, the tests were conducted neat. Unless otherwise noted 5.00 g of hydrocarbon or low-polarity organic chemical was placed on 100 g of water and 2.00 g of SEPTON 4033 was added evenly across the surface of the water. The aromatic hydrocarbons tended to dissolve the SEPTON 4033 at low elastomer concentrations, but worked well when the experiment was conducted at higher SEPTON 4033 concentrations. Most of the low-polarity organic chemicals tested received higher ratings at higher concentrations of the preferred invention. For optimization, different preferred invention concentrations are required for different types of substances. It is interesting to note, tetrachloroethylene tended to dissolve the SEPTON 4033 mat into a firm gel, but 1,1,1-trichloroethane matted with out dissolving the SEPTON 4033. Dimethylmethyl phosphonate is often used as a simulant for the chemical warfare agent Sarin, a nerve agent. This suggests utility for agricultural chemical spill clean up or initial protection from chemical warfare agents.

TABLE 2

SEPTON 4033 Performance With Hydrocarbons and Low-Polarity Organic Chemicals.

| Substance | Elasticity Rating | Absorption Rating | Comments |
|---|---|---|---|
| Unleaded Gasoline | 6 | 8 | |
| JP-8 Jet Fuel | 6 | 8 | |
| No. 2 Diesel Fuel | 6 | 7 | |
| Citgo 10 W-30 Synthetic Motor Oil | 8 | 10 | |
| Trop Artic 10 W-30 Motor Oil | 8 | 7 | |
| Norpar 13 (Paraffinic Hydrocarbon) | 10 | 10 | |
| Exxsol D-110 (Aliphatic Hydrocarbon) | 10 | 10 | |
| Isopar M Fluid (Synthetic Isoparaffin) | 8 | 10 | No Mat |
| Aromatic 100 Fluid | 4 | 8 | Dissolved SEPTON 4033 |
| FCC Slurry Oil Hydrotreater Feed | 6 | 5 | Used 1.1 g SEPTON 4033, Tacky |
| Mineral Spirits | 4 | 7 | Dissolved SEPTON 4033 |
| Mineral Spirits | 9 | 10 | Used 5 g SEPTON 4033 |
| Xylenes, Mixed | 4 | 7 | Dissolved SEPTON 4033 |
| Xylenes, Mixed | 9 | 10 | Used 5 g SEPTON 4033 |
| 1,1,1-Trichloroethane | 8 | 10 | No water, left dry surface |
| Tetrachloroethylene | 6 | 8 | No water, TCE dissolved SEPTON 4033 |
| 56% Malathion | 8 | 7 | No water, left slight film |
| Dimethylmethylphosphonate | 8 | 6 | No water, left slight film |
| Methylethylketone | 8 | 7 | No water, left slight film |

1. 100 g of water

EXAMPLE 5

Bartlesville Sand crude oil (5.00 g) was added to a beaker with 100 g of water. 1 g of SEPTON 4033 containing 2% sodium stearate was added evenly over the surface. After 60 minutes, a significant reduction in tackiness and oil bleed was observed as demonstrated by Entries 1 and 2 in Table 3. Likewise, blending 15% KRATON D1701 with SEPTON 4033 provided a similar improvement (Entries 1 and 3).

TABLE 3

Improvements to SEPTON 4033 Elastomer Crude Oil[1] Absorption on Water[2].

| Entry No. | Elastomer | Elasticity Rating | Absorption Rating | Comments |
|---|---|---|---|---|
| 1 | 1.00 g SEPTON 4033 | 7 | 7 | Control |
| 2 | 1.00 g SEPTON 4033 w/2% Sodium Stearate | 9 | 9 | Reduced tackiness and oil bleed |
| 3 | 1.00 g SEPTON 4033 w/15% KRATON D1701 | 9 | 9 | Reduced tackiness and oil bleed |

[1]. Bartlesville Sand Crude Oil
[2]. 100 g of water

EXAMPLE 6

Bartlesville Sand Crude oil was added to water in a bottle and shaken vigorously. The sample had 1,260 ppm Total Petroleum Hydrocarbons (TPH) as determined by gas chromatography (gc) (EPA Method 8015m). A 20 ml syringe was packed with SEPTON 4033 and the crude oil/water mixture was poured into the syringe. The filtrate was collected and shown by gc analysis to contain 113 ppm crude oil. Half of the filtrate was placed in a second syringe packed with SEPTON 4033 and the filtrate was collected and found to contain 1.52 ppm TPH. This experiment demonstrates the applicability of the invention as a filter for cleaning hydrocarbon contaminated water.

EXAMPLE 7

Approximately 100 g of SEPTON 4033 crumb was placed in a plastic bag and vacuum sealed. The bag was left for two days at room temperature and re-opened. The SEPTON 4033 crumb had not changed in any way. Another bag was placed in an oven at 106° F. for 24 hours. When the vacuum seal was broken, the particulate was unexpectedly molded into a single mat of SEPTON 4033. The mat had dimensions of 4×2 inches. The tear strength or force required to tear the mat in half was determined to be 10 lbs using a digital scale. The molding procedure at 106° F. was repeated with KRATON G-1650 and an identical size mat was formed. The tear strength or force required to tear the mat in half was determined to be approximately 200 g which is substantially less. Crude oil (5.00 g) was allowed to drip onto a 1.00 g square piece of the SEPTON 4033 mat and it was determined the mat absorbed the same quantity of oil or fuel that it would normally absorb as if it were a crumb. This example demonstrates the superior physical strength properties of the invention over the prior art. This example also teaches this elastomer can be molded into a form for easy recovery of a hydrocarbon contaminant.

EXAMPLE 8

Leachability of a contaminated substance is determined by analysis of the leachate extraction water from a Toxicity Characteristic Leaching Procedure (TCLP), EPA 1311 for Total Petroleum Hydrocarbons (TPH)(EPA 8015m). Passing EPA TCLP is a requirement of solid characteristic waste that is land filled. A 10.00 g sample of kerosene was placed on 100 g of water in a beaker and 6.20 g of SEPTON 4033 was added evenly to the surface of the kerosene. The sample was allowed to stand for 24 hours. A firm mat formed with gel-like properties and a slight hydrocarbon odor. The mat was cut into cubic chunks of approximately 1 centimeter and extracted according to the EPA TCLP method EPA 1311. GC analysis (EPA 8015m) of the extract indicated TPH of the boiling range for kerosene to be 7.82 ppm. This level of leachate is well with in the regulatory range.

EXAMPLE 9

COD is an important parameter for determining the amount of organic pollution in water. The term has its widest application in measuring waste loadings of treatment plants and in evaluating the efficiency of treatment processes. Most commercial spill response products of the art do not meet the stringent COD standards for facilities that is set by the EPA for storm water runoff at 120 mg/L of water. COD testing demonstrated the preferred invention, SEPTON 4033, is an environmental attractive material because it is not a COD contributor and any product absorbed by SEPTON 4033 does not extensively contribute to the COD of the system by leaching into water.

COD is determined by measuring the amount of oxidant consumed using titrimetric, photometric or calorimetric methods. The COD test uses a strong chemical oxidant, potassium dichromate in sulfuric acid, heated to 150° C. for two hours to oxidize the organic carbon of the system to carbon dioxide and water. Pre-measured quantities of oxidant may be purchased in capped vials. Two ml of wastewater sample is added to the tube prior to heating. The sample usually requires dilution by some factor to bring the COD into the measuring range of 0-1,500 mg/l. The colorimeter is zeroed using a blank water sample, and then the COD is read from the instrument and multiplied by the dilution factor. For the COD analysis, HACH Reactor Digestion Method 8000 (EPA approved for wastewater analysis from EPA Method 410.4) with 0-1,500 mg/L test vials and a HACH 890 colorimeter was used.

To evaluate the COD contribution of the elastomeric invention, 5.00 g of SEPTON 4033 was added to 1 L of tap water in a clean 2000 ml beaker. A 5 ml water sample was taken from the center of the beaker. A COD vial (3 mg/l limit) was filled with 2 ml of the water sample and the COD contribution of SEPTON 4033 was determined to be 5 mg/l after subtracting out the tap water blank of 4 mg/l. COD measurement is accomplished using the HACH Reactor Digestion Method 8000 (EPA approved for wastewater analysis from EPA Method 410.4) [FR Apr. 21, 1980, 45(78), 26811-26812] with 0-1,500 mg/l test vials and a HACH 890 colorimeter.

In another experiment, 10 g of JP-8 jet fuel was added to 1 L of tap water in a clean 2000 ml beaker. A 5 ml water sample was taken immediately for initial COD analysis. Five grams of the Septon 4033 was sprinkled on the surface of the JP-8. Additional 5 ml samples were taken at 5, 15, 30 and 60 minutes for COD analysis.

The results are shown in Table 4 from the analysis. The 10.00 g of JP-8 covered the surface of the water, so it was not possible to obtain a sample by pipette without disturbing the JP-8 layer and some of the JP-8 registered in the initial test result. Consequently, the COD values for the pollutant only were higher (530 mg/l). Once the SEPTON 4033 was added to the JP-8, the JP-8 layer contracted as it was absorbed into the Aqua N-Cap polymer. Within 5 minutes a gel mat had formed and hardened as the test proceeded to 60 minutes making it easier to grab sample aliquots. The water COD continued to decrease from 68 mg/l at 5 minutes to 37 mg/l at 60 minutes. After the residue was carefully removed, the COD was 21 mg/l. The experiment was repeated using Aircraft Engine Oil 7808. The COD vials used were 20 mg/l limit and the COD of the water was consistently below the limit.

TABLE 4

Static COD Testing (mg/l) of Contaminant With SEPTON 4033 on Water[1].

| Contaminants | Pollutant/ Tap Water | Pollutant + ANC[2] on Tap Water | | | | After Remove Residue |
|---|---|---|---|---|---|---|
| | | 5 Min. | 15 Min. | 30 Min | 60 Min. | |
| JP-8 | 530 | 68 | 41 | 34 | 37 | 21 |
| Engine Oil 7808 | <20 | | <20 | <20 | <20 | <20 |

[1]. Average of Triplicate Runs
[2]. ANC = Aqua N-Cap polymer

SEPTON 4033 is an exceptional elastomer for recovering hydrocarbons from the surface of water and leaving the water with very low COD after the remediation. The water with JP-8 fuel had an average residual COD level of 21 mg/l. The 7808 motor oil tests consistently averaged at <20 mg/l (limit).

EXAMPLE 10

Products used for spill recovery should be listed on the National Oil and Hazardous Substances Pollution Contingency Plan Product Schedule List, Subpart J, 40 CFR 300.900 or NCP List for short. When the listing requirements for a product are satisfied, the product is then authorized for use on a particular oil spill on the seas. The preferred triblock polymer of the invention has satisfied the testing requirements and it is not toxic to marine life nor does it contain hazardous constituents.

Four 96-hour static LC50 tests were conducted by Environmental Enterprises USA, Inc. located in Slidell, La. 70461 using the preferred invention, SEPTON 4033, No. 2 Fuel Oil, and a Standard Reference Toxicant (SRT) with Sodium Dodecyl Sulfate. Seven day old Menidia beryllina were used when the test was initiated in synthetic seawater and for a separate test, mysids were collected from breeding cultures of M. bahia and used. Materials and methods for the work performed are strictly as stated in DR/Vol. 59, No. 178/47461-47464: Revised Standard Dispersant Toxicity Test.

The inventive polymer, SEPTON 4033, was used at the highest test concentration possible, 800,000 ppm, 800 ml of product and 200 ml of dilution water for a total of 1000 ml. Other concentrations were 50,000, 100,000, 200,000, and 400,000. A 1000 ppm solution (0.50 ml No. 2 fuel oil plus 499.5 ml synthetic seawater) of No. 2 fuel oil was used in the test. Other concentrations were 0.7, 1.3, 2.5, and 5.0 ppm. A 1:10 mixture of the invention to No. 2 Fuel Oil (0.05 ml or 0.01 g of the invention plus 0.50 ml of No. 2 Fuel Oil plus 549.45 ml of synthetic seawater) was used. Other test concentrations used were 0.7, 1.3, 2.5, and 5.0 ppm. The SRT control determines sensitivity of test organisms to a known toxicant at 10,000 ppm was used at 2.6, 4.3, 7.2, 12.0, and 20.0 ppm SDS. The 48 hour survival data were used to estimate the 48-hour LC50, a point estimate of the concentration expected to result in 50% mortality to exposed M. bahia or M. beryllina larvae after 96 hours of exposure. Survival in the concurrent laboratory performance control was 100.0 percent.

At 24-hour intervals during the 96-hour tests, water quality parameters in each treatment were measured. At 0, 24, 48, 72, and 96-hour intervals the number of survivors in each replicate of each treatment were recorded. The results of the aquatic testing are shown in Table 5. As can be seen by the data, SEPTON 4033 of the invention alone has a very low level of toxicity on the water's surface because of its hydrophobic nature. Testing of a SEPTON 4033/No. 2 fuel oil mixture demonstrated SEPTON 4033 does not make the No. 2 fuel oil more toxic than the No. 2 fuel oil alone.

TABLE 5

Aquatic Testing of SEPTON 4033 Polymer on Water.

| Results | M. bahia Survival | | M. beryllina Survival | |
|---|---|---|---|---|
| | 48-hr LC50 | 95% Confid. Interval | 48-hr LC50 | 95% Confid. Interval |
| Invention[1] | 104,000 ppm | 84,600-126,000 ppm | 482,000 ppm | 403,000-577,000 ppm |
| No.2 Fuel Oil | 1.45 ppm | 1.20-1.75 ppm | 15.8 ppm | 14.3-17.4 ppm |
| 1:10 Invention/No.2 Fuel Oil | 2.13 ppm | 1.83-2.49 ppm | 22.5 ppm | 19.1-26.5 ppm |
| Reference Toxicant SDS | 9.55 ppm | 8.56-10.7 ppm | 3.65 ppm | 3.30-4.03 ppm |

[1]. Invention = a SEPTON 4033 polymer base

The NCP application has been submitted for listing the invention on the NCP. Table 6 lists the analyses performed in accordance with 40 CFR 136 and amendments. The metals analysis is indicated most of the heavy metals were below detection limits of the analysis except for a low concentration of copper.

TABLE 6

Analyte Testing of SEPTON 4033 Polymer.

| Analyte/Method # | Result[2] | Detection Limit |
|---|---|---|
| pH/9045C | 4.08 | ±0.01 |
| Specific Gravity/ASTM D1298 | N/A | — |
| Flashpoint/1020B | >110° C. | ±1° C. |
| Cyanide/335.4 | ND | 0.1 ppm |
| Arsenic/CLP | ND | 1.0 |
| Cadmium/CLP | ND | 0.05 |
| Chromium/CLP | ND | 0.325 |
| Copper/CLP | 17.25 | 0.275 |
| Nickel/CLP | ND | 0.225 |
| Lead/CLP | ND | 0.08 |
| Zinc/CLP | ND | 0.45 |
| Mercury/CLP | 0.02 | 0.02 |

[1]. Invention = a SEPTON 4033 polymer base
[2]. Data reported in mg/kg unless otherwise noted.

As will be apparent to those skilled in the art, a number of modifications could be made to the preferred embodiments which would not depart from the spirit or the scope of the present invention. While the presently preferred embodiments have been described for purposes of this disclosure, numerous changes and modifications will be apparent to those skilled in the art. Such changes and modifications are encompassed within the spirit of this invention.

What is claimed is:

1. A method for recovering a hydrocarbon or low-polarity organic chemical using a thermoplastic elastomer triblock copolymer of the general configuration A-B-A comprising:
   selecting A to be a monoalkenylarene polymer at a minimum of approximately 15 weight percent of A;

selecting B to be a hydrogenated polymer consisting of both a plurality of isoprene monomers of at least 10 weight percent of B and a plurality of butadiene monomers of at least 25 weight percent of B; and treating a hydrocarbon or low-polarity organic chemical with said thermoplastic elastomer triblock copolymer in an amount equal to 0.01 to about 1.5 weight parts per weight part of said hydrocarbon or low-polarity organic chemical.

2. The method of claim 1 wherein recovering said hydrocarbon or low-polarity organic chemical comprises:

permitting said thermoplastic elastomer triblock copolymer to mix with said hydrocarbon or low-polarity organic chemical on a surface selected from a group consisting of saltwater, freshwater, industrial waste water, oilfield brine, water containing ice, ice, cement, soil, gravel, rock, or ceramic material.

3. The method of claim 1 wherein treating said hydrocarbon or low-polarity organic chemical occurring on a body of water comprises:

permitting said thermoplastic elastomer triblock copolymer to mix with said hydrocarbon or low-polarity organic chemical to form a solid elastic mat; and recovering said mat.

4. The method of claim 1 wherein treating a spill including said hydrocarbon or low-polarity organic chemical occurring on a body of water comprises:

passing said spill and a portion of said body of water through a filter comprised essentially of said thermoplastic elastomer triblock copolymer.

5. The method of claim 1 wherein treating said hydrocarbon or low-polarity organic chemical occurring in the form of mist, fog, or aerosol released into the atmosphere comprises:

passing a portion of the atmosphere through a filter comprised essentially of said thermoplastic elastomer triblock copolymer.

6. The method of claim 1 wherein said hydrocarbon or low-polarity organic chemical comprises:

drilling mud and drill cuttings which when treated with said thermoplastic elastomer triblock copolymer form a fuel source.

7. The method of claim 1 wherein recovering said hydrocarbon or low-polarity organic chemical comprises:

placing a disposable sock, boom, or pad containing said thermoplastic elastomer triblock copolymer in contact with said hydrocarbon or low polarity organic chemical, wherein said sock, boom, or pad comprises a fabric or textile sheathing having pore size of approximately 200 microns;

permitting said hydrocarbon or low-polarity organic chemical to penetrate said sheathing to mix with said thermoplastic elastomer triblock copolymer; and recovering said sock, boom, or pad.

8. The method of claim 1 including recovering said hydrocarbon or low-polarity organic chemical from a spill comprising:

applying particles of said thermoplastic elastomer triblock copolymer to said spill;

permitting said thermoplastic elastomer triblock copolymer to mix with said spill to form a solid elastic mat; and recovering said mat.

9. The method of claim 1 wherein a metal stearate is added to said thermoplastic elastomer triblock copolymer.

10. The method of claim 1 wherein a styrene-ethylene/propylene diblock or triblock copolymer is added to said thermoplastic elastomer triblock copolymer at approximately 15 weight percent of said thermoplastic elastomer triblock copolymer.

11. The method of claim 1 wherein said hydrocarbon or low-polarity organic chemical comprises at least one of: oils, waxes, hydrocarbons, fuels, crude oils, bitumen, edible oils, edible waxes, saturated aliphatic, unsaturated aliphatic, napthenic, aromatic substituted oxygen derivatives of alcohols, phenols, ethers, ether alcohols, epoxides, esters, ester derivatives, aldehydes, acetals, ketones, ketals, nitrogen containing derivatives of amines, nitrites, sulfur containing derivatives of mercaptans, disulfides, heterocyclic derivatives of disulfides, halocarbons, organosilanes, halosilanes, silicones, or chemicals derived from petroleum.

12. A method of preventing contamination of an environment from a hydrocarbon or low-polarity organic chemical comprising:

applying particles of a polymeric material, consisting essentially of a styrene-ethylene/ethylene/propylene triblock copolymer containing from 20 to about 40 percent styrene, in an amount equal to 0.01 to about 1.5 weight parts per weight part of said hydrocarbon or low-polarity organic chemical;

permitting said particles to mix with and absorb said hydrocarbon or low-polarity organic chemical to form a low density solid absorbent; and removing said solid absorbent.

13. The method of claim 12 including permitting said particles to mix with a spill including said hydrocarbon or low-polarity organic chemical occurs on a surface selected from a group consisting of saltwater, freshwater, industrial waste water, oilfield brine, water containing ice, ice, cement, soil, gravel, rock, or ceramic material.

14. The method of claim 12 wherein applying said particles to said spill including said hydrocarbon or low-polarity organic chemical occurring on a body of water comprises:

passing said spill and a portion of said body of water through a filter comprised essentially of said polymeric material.

15. The method of claim 12 wherein applying said particles to said spill including said hydrocarbon or low-polarity organic chemical spill comprises:

placing a disposable sock, boom, or pad containing said polymeric material in contact with said spill, wherein said sock, boom, or pad comprises a fabric or textile sheathing having pore size of approximately 200 microns.

16. The method of claim 12 wherein a metal stearate is added to said polymeric material.

17. The method of claim 12 wherein a styrene-ethylene/butylenes diblock or triblock copolymer is added to said polymeric material at approximately 15 weight percent of said polymeric material.

18. The method of claim 12 wherein said hydrocarbon or low-polarity organic chemical is contained in:

drilling mud and drill cuttings which when treated with said thermoplastic elastomer triblock copolymer elastomer triblock copolymer form a fuel source.

19. The method of claim 12 wherein said hydrocarbon or low-polarity organic chemical comprises at least one of: oils, waxes, hydrocarbons, fuels, crude oils, bitumen, edible oils, edible waxes, saturated aliphatic, unsaturated aliphatic, napthenic, aromatic substituted oxygen derivatives of alcohols, phenols, ethers, ether alcohols, epoxides, esters, ester derivatives, aldehydes, acetals, ketones, ketals, nitrogen containing derivatives of amines, nitrites, sulfur containing derivatives of mercaptans, disulfides, heterocyclic derivatives of disulfides, halocarbons, organosilanes, halosilanes, silicones, or chemicals derived from petroleum.

* * * * *